United States Patent [19]

Hoday et al.

[11] 3,738,328
[45] June 12, 1973

[54] FISH FEEDER
[75] Inventors: Steven F. Hoday, Elk Grove Village; Jay J. Bolante, Chicago, both of Ill.
[73] Assignee: Arthur I. Appleton, Northbrook, Ill.
[22] Filed: Feb. 7, 1972
[21] Appl. No.: 224,002

[52] U.S. Cl. ............................................ 119/51.13
[51] Int. Cl. ............................................. A01k 5/02
[58] Field of Search .................... 119/51.11, 51.12, 119/51.13

[56] References Cited
UNITED STATES PATENTS
3,050,029   8/1962   Appleton .......................... 119/51.13
2,865,447   12/1958   Kaufman ...................... 119/51.11 X Primary Examiner—Louis G. Mancene
Assistant Examiner—J. N. Eskovitz
Attorney—Howard H. Darbo, Louis Robertson and Edward C. Vandenburgh

[57] ABSTRACT

A fish feeder has a support plate adapted to be affixed to the top of an aquarium with a portion of the support plate overhanging the aquarium. The support plate has a vertical opening in that portion. An electric motor is secured to the support plate and has its driving shaft extending vertically therefrom. Coaxial with the shaft is an annular feed carrier having a plurality of pockets which move across the support plate opening as the carrier rotates. A connection between the shaft and the feed carrier periodically indexes the feed carrier forward to move another pocket over the opening. A removable housing has its bottom surrounding the feed carrier and supported on the plate. The magazine has inner and outer walls connected by ribs and which define vertical hoppers open at the bottom. Feed can be put in these hoppers to fill the pockets. The magazine covers the space over the carrier at the location above the opening so that feed in the hopper cannot fall directly through a pocket above the opening and out the opening.

7 Claims, 4 Drawing Figures

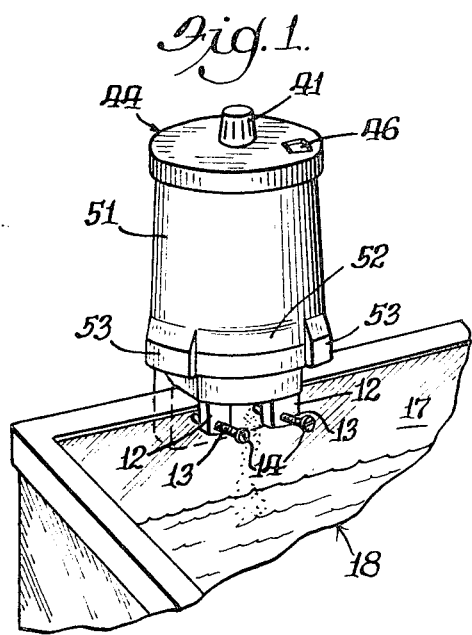
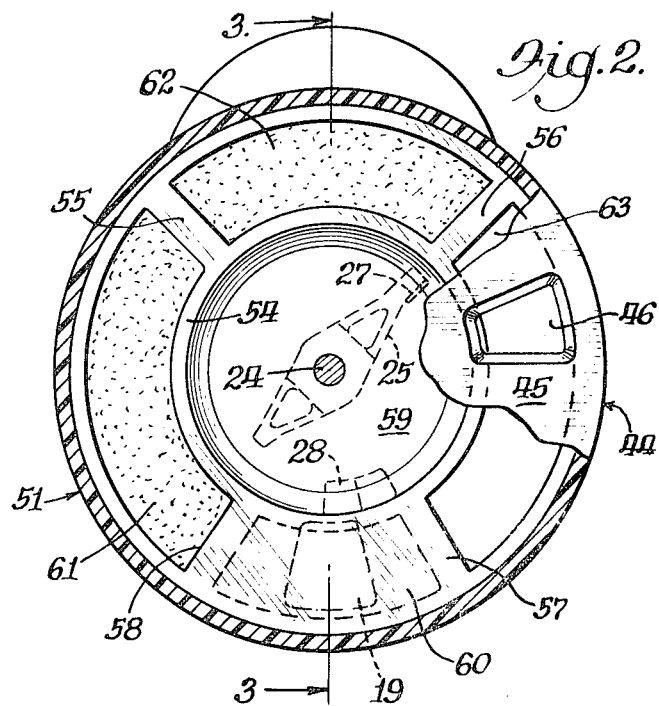
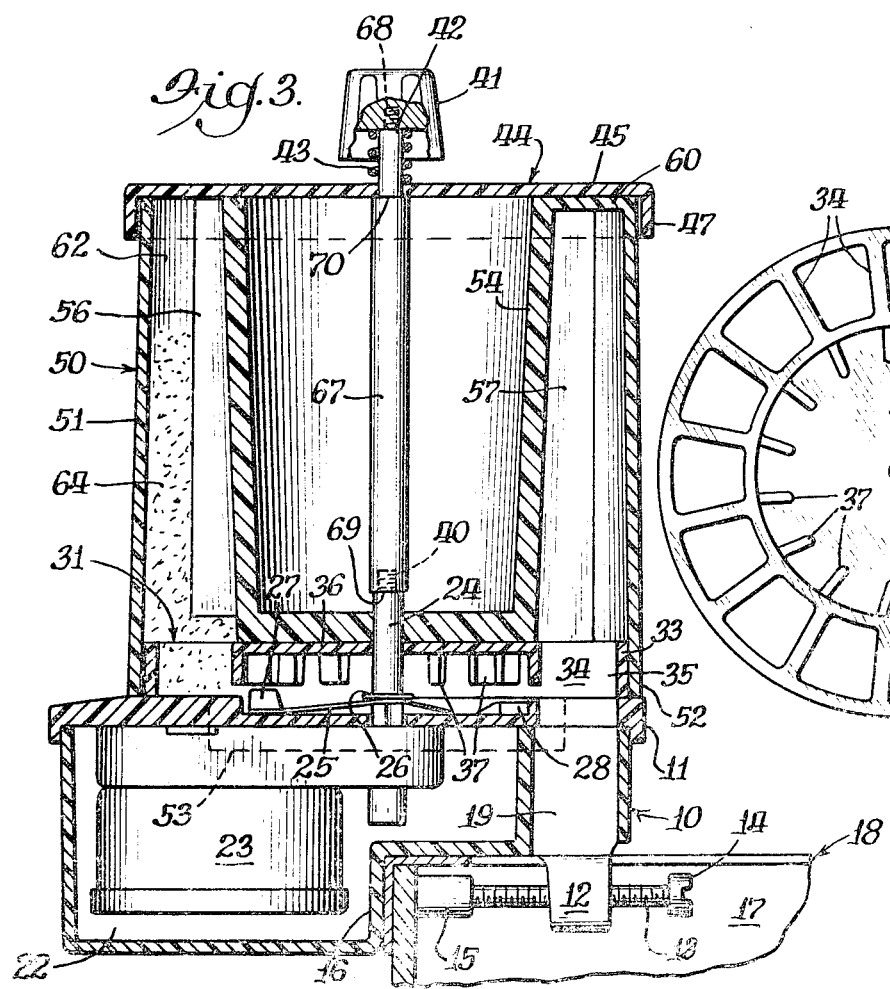
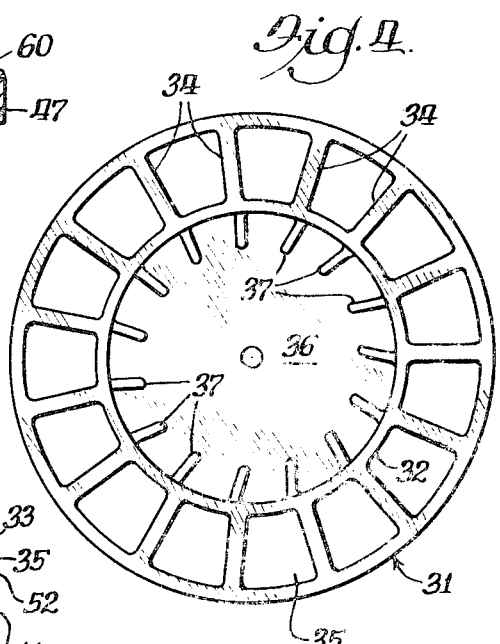

3,738,328

FISH FEEDER

BACKGROUND AND SUMMARY OF THE INVENTION

The present invention is directed toward providing a feeding magazine for a fish feeder of the general type disclosed in U. S. Pat. No. 3,050,029 so that the feeder will serve to supply food to fish for a substantially longer time before an individual must refill it. For example, a person may wish to go on an extended vacation and yet make sure that the fish will be fed without the necessity of someone else attending to them. While a fish feeder of the type disclosed in said patent might operate for several weeks upon one filling, using the magazine of the present invention the interval between fillings can be extended to a number of months. The magazine can be provided as an attachment so that the fish feeder can be alternatively used in its original form where only a limited number of feedings are available between fillings, or in a modified form using the magazine so that a very large number of feedings will be provided between fillings.

A further advantage of the invention is that it facilitates the providing of measured amounts of feed. The pockets of the feeder are filled automatically and always with the same amount. Where each of the individual pockets is filled manually, this is considered, by some, to be somewhat laborious to avoid spilling the feed. However, it is much easier to fill the magazine of the present invention, which magazine in turn will fill the pockets. Other advantages will become apparent from the following description.

DESCRIPTION OF THE DRAWING

FIG. 1 is a perspective vie of a portion of an aquarium and having mounted thereon a fish feeder embodying the present invention;

FIG. 2 is a plan view, with a substantial portion of the cover broken away;

FIG. 3 is a vertical section as seen at line 3—3 of FIG. 2; and

FIG. 4 is a bottom view of the feed carrier.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

There is a main frame, generally 10, which includes a support plate 11. The frame has depending posts 12 which are threaded to receive mounting screws 13. At one end the screws have a slotted head 14 and at the other end they have a rubber pressure pad 15. The pressure pads are opposite a wall 16 of the frame. Thereby the frame may be clamped on the top of a side wall 17 of an aquarium, generally 18. When so clamped on, a vertical opening 19 through the main frame, including the support plate, is positioned over the interior of the aquarium.

The main frame 10 defines an internal opening 22 within which is an electric clock motor 23. This motor has an output shaft 24 which rotates once every 24 hours. Shaft 24 extends vertically through the support plate 11 and thus out of the top of the frame. The shaft carries an arm 25 which rotates with the shaft and is held in place by a C-washer 26. At its outer end the arm carries an upwardly extending finger 27. The arm 25 is in the nature of a spring and normally extends downwardly as illustrated in FIG. 3. However, there is a short cam 28 on the top of support plate 11. As the arm moves up onto and across this cam the finger 27 is raised.

A carrier, generally 31, has an inner wall 32 and an outer wall 33. These walls are connected by a plurality of radial ribs 34 so as to define a plurality of pockets 35 positioned in an annular ring. A top plate 36 extends across the space within the inner wall 32. Extending downwardly from the bottom of plate 36 are a plurality of teeth 37. As the arm 25 goes over cam 28, the finger 27 is raised to engage one of teeth 37. This provides a rotary connection between shaft 24 and carrier 31 so that the next successive pocket 35 is indexed forwardly to a position at which it is above the vertical opening 19 in the support plate. This permits the contents of that next successive pocket to fall through opening 19 into the fish tank 18. As the arm 25 moves off of cam 28, the finger moves downwardly disengaging from the tooth 37 so that the carrier remains at the established position for another 24 hours.

Shaft 24 has a threaded stud 40 extending from the top thereof. A knob 41 has an internally threaded shaft 42, the threads of which will mate with the threads of stud 40. A spring 43 is secured to knob 41 and extends downwardly therefrom. A cover, generally 44, has a top plate 45 with an opening 46 therein, and a downwardly extending peripheral flange 47. The flange 47 has an internal diameter just slightly larger than the external diameter of carrier 31 thus, although it is not illustrated in the drawings, the cover 44 may be placed over the support plate 43 and held in place by the knob 41 being threaded onto stud 40.

As thus far described, the apparatus is known. It corresponds substantially to that illustrated and described in U.S. Pat. No. 3,050,029.

The present invention provides a supplemental magazine, generally 50. It comprises an outer wall 51 which at its bottom has a diameter just slightly larger than the outside diameter of carrier 31 and at its top is just slightly smaller than the internal diameter of flange 47 so that the cover 44 will fit thereover. Portions of the wall 51, e.g. area 52, rest on the top of support plate 11. Other portions 53 of the outer wall 51 fit down about the sides of support plate 11 and lock the magazine 50 against rotation with respect to the support plate (the support plate 11 being non-circular about the axis of shaft 24).

The magazine includes an inner wall 54 which is connected to the outer wall by a plurality of radial ribs 55, 56, 57 and 58. The bottoms of the ribs 57 and 58 are just above the top of carrier 31. Also just above the top of carrier 31 is an inner plate 59 closing off the bottom of the area within the inner wall 54. Across the top, between ribs 57 and 58, is a top plate 60. Thus the ribs 57 and 58, in conjunction with top plate 60 (and the inner and outer walls) prevent any feed from falling directly through the pocket that is over opening 19. There are three vertical hoppers 61, 62 and 63 which can be filled with particulate feed 64.

A shaft extension 67 has a threaded socket in its bottom end to receive threaded stud 40 and has a threaded stud 68 at its top end to receive the threaded socket in shaft 42 of knob 41. The main portion of this shaft extension is somewhat larger in diameter than the adjacent shafts. It thus forms an abutment 69 at its bottom end when it is threaded onto shaft 24 and also defines an abutment 70 adjacent its upper end.

Assuming that one already has an embodiment of the previously known fish feeder, as initially described herein, it is a simple matter to add the described magazine thereto. He would first unscrew knob 41 from shaft 24. Then he would remove the cover 44 along with the knob 41. The magazine is slipped down over the carrier 31 with the portions 53 fitting about the support plate 11. The shaft extensions 67 is then threaded onto stud 40. Either before or after the hoppers 61-63 are filled with feed, the cover 44 is placed over the top of the magazine 50. The knob 41 is threaded onto the top of the shaft extension 67. Spring 43 presses the cover down against abutment 70 and against the top of the magazine. While the hoppers could thereafter be filled through opening 46 in the cover, it will generally be found to be more simple to remove the cover 44 for the filling of the hoppers 61-63. Abutment 69 will contact plate 59 and prevent the magazine from being raised significantly.

The feed from the hoppers descends to fill the pockets 35 in carrier 31. Each time that a finger 27 engages one of the teeth 37, a filled pocket 35 is moved over above the opening 19. The feed from that pocket then descends through opening 19 into the fish tank. Actually, this occurs rather slowly so that all the feed is not dumped at once. During the indexing movement the bottom of rib 57 strikes off the top of the next succeeding pocket so that it will contain the specifically measured amount of feed.

We claim:

1. In an automatic feeder for fish or other pets for supplying a particulate feed and comprising a support plate having a vertical discharge opening therethrough, power means mounted on said plate including a vertically positioned rotating shaft, a feed carrier cylindrical about a vertical axis and having a plurality of pockets positioned in an annular pattern about said axis, said pockets being open at the top and bottom, said carrier being rotatably mounted on said plate and positioned so that a portion of said pattern overlies said opening, means operatively connecting said shaft and said carrier for periodically indexing said carrier to position successive pockets over said opening, the improvement comprising a magazine for automatically filling said pockets with feed and including:

an outer cylindrical wall surrounding said carrier in juxtaposition thereto and bearing on said support plate, said wall having means engaging said plate to fix the rotational position of said wall about said axis, partition means within said wall and secured thereto and defining a vertical hopper communicating with the tops of said pockets at a location other than above said opening, said partition means closing off the space above the carrier at the location above the opening so that feed cannot fall from the hopper directly through a pocket and out the opening.

2. In a feeder as set forth in claim 1, wherein said partition means includes an inner wall which has a lower end in juxtaposition with the top of said carrier and at said lower end is circular of substantially the same diameter as the diameter of the inside of said annulus.

3. In a feeder as set forth in claim 2, wherein the inner wall is a substantially cylindrical wall within said outer wall and concentric therewith, said magazine including radial webs connecting the inner and outer walls, and a closure extending across the inside of said inner wall.

4. In a feeder as set forth in claim 1, wherein said magazine is formed of transparent plastic.

5. A magazine for use with an automatic feeder for fish or other pets for supplying a particulate feed and comprising, a support plate having a vertical discharge opening therethrough, a feed carrier cylindrical about a vertical axis and having a plurality of pockets positioned in an annular pattern about said axis, said pockets being open at the top and bottom, said carrier being rotatably mounted on said plate and positioned so that a portion of said pattern overlies said opening, power means mounted on said plate and including a rotating shaft extending along said axis, means operatively connecting said shaft and said carrier for periodically indexing said carrier to position successive pockets over said opening, said magazine comprising:

an outer cylindrical wall surrounding said carrier in juxtaposition thereto and bearing on said support plate, said wall having means engaging said plate to fix the rotational position of said wall about said axis, partition means within said wall and secured thereto and defining a vertical hopper communicating with the tops of said pockets at a location other than above said opening, said partition means closing off the space above the carrier at the location above the opening so that feed cannot fall from the hopper directly through a pocket and out the opening, said partition means including a central annular wall of a diameter substantially corresponding to the inside of said annulus.

6. A magazine as set forth in claim 5, wherein said central wall extends to a height substantially corresponding to the height of the outer wall and the two are connected, a partition closing off the bottom of the space within the central wall, said partition having an opening therethrough to receive said shaft.

7. A magazine as set forth in claim 6 for use with a feeder of the type set forth which includes a cover having a peripheral downward flange, the top of said shaft being threaded, and a knob threaded onto said shaft to hold said cover in place, said magazine including:

a shaft extension having a length substantially corresponding to the height of said feeder and having one end threaded to mate with the top of the shaft and the other end threaded to mate with the knob, said outer wall having a diameter at the top just slightly smaller than the diameter of the inside of said flange whereby the cover will fit on top of the magazine.

\* \* \* \* \*